United States Patent [19]

Ferguson

[11] Patent Number: 4,677,550

[45] Date of Patent: Jun. 30, 1987

[54] METHOD OF COMPACTING AND SEARCHING A DATA INDEX

[75] Inventor: David E. Ferguson, Pacific Palisades, Calif.

[73] Assignee: Amalgamated Software of North America, Inc., Newport Beach, Calif.

[21] Appl. No.: 537,701

[22] Filed: Sep. 30, 1983

[51] Int. Cl.[4] .......................... G06F 7/22; G06F 12/00
[52] U.S. Cl. ...................................... 364/300; 364/200
[58] Field of Search ... 364/200 MS File, 900 MS File, 364/300

[56] References Cited

U.S. PATENT DOCUMENTS

| | | | |
|---|---|---|---|
| 4,318,184 | 3/1982 | Millett et al. | 364/900 |
| 4,422,158 | 12/1983 | Galie | 364/900 |
| 4,503,514 | 3/1985 | Urquhart | 364/900 |

*Primary Examiner*—Archie E. Williams
*Assistant Examiner*—Thomas C. Lee
*Attorney, Agent, or Firm*—Spensley Horn Jubas & Lubitz

[57] ABSTRACT

An improved method for indexing and accessing data stored in a computer storage system, comprising a multi-way tree structure having interconnected branch nodes and leaf nodes. The leaf nodes contain a large number of distinction bits, rather than a smaller number of search keys as known in the prior art. A distinction bit is determined by comparing two selected search keys and determining the ordinal number of the first bit that is different between the two keys. The density of distinction bit entries in the leaf nodes permits shorter access times to obtain data records in a computer storage system.

10 Claims, 11 Drawing Figures

BIT TREE STRUCTURE

LEAF NODE SEARCH PROCEDURE

BIT TREE STRUCTURE

BRANCH NODE SEARCH PROCEDURE

LEAF NODE SEARCH PROCEDURE

LEAF NODE INSERT PROCEDURE

BRANCH NODE INSERT PROCEDURE

DISTINCTION BIT COMPUTATION PROCEDURE

NODE SPLIT PROCEDURE

METHOD OF COMPACTING AND SEARCHING A DATA INDEX

BACKGROUND OF THE INVENTION

1. Field of the Invention

This invention relates to a method for searching data in a computer data storage system, and more particularly to an improved method for implementing a data index tree structure and an improved method for searching such a structure.

2. Description of the Prior Art

In the computer arts, data is stored in some form of storage system, such as magnetic disks. For very large data bases, it is extremely inefficient and time consuming to search all data records in the storage system in order to find a particular record. A more efficient, but still cumbersome and time consuming, method is to create a search key for each data record that uniquely identifies the record. Each search key is associated with a data pointer that indicates the location in the computer storage system of the data record associated with the search key. A common type of pointer is a relative record number. Through the use of such pointers, the data records themselves need not be kept in sequential order, but may be stored in random locations in the computer storage system. A search for a particular data record is speeded up by sequentially searching a compiled index of such search keys, rather than the data records themselves.

A much more efficient search method for such an index is to create a tree structure, rather than a sequential file, for the search keys. One such tree structure is a "B-tree". The use of B-trees to structure indexes for data files in computer data storage systems is well known in the prior art. (See, for example, Knuth, *The Art of Computer Programming*, Vol. 3, pp. 473-479). A B-tree consists of nodes which can be either leaf nodes or branch nodes. A branch node contains a search key and associated pointers (such as relative record numbers) to other nodes. A leaf node contains pointers to data records. One node in the tree is the root node, which can be either a leaf node (only for a tree with a single node) or a branch node. In both branch and leaf nodes, the number of pointers is always one greater than the number of search keys. The "height" of a tree is equivalent to the longest number of branch paths from the root node to the leaf nodes.

In the most simple B-tree, each node contains one search key and two associated pointers. Such a tree structure, sometimes referred to as a binary tree, theoretically provides a very efficient search method. If the number of nodes in this type of tree is equal to or less than $2^n$, then only "n" searches are required to locate a data record pointer in any leaf node.

In practice, a simple binary tree is inefficient. Most data bases are stored on relatively slow storage devices, such as magnetic disks. The time required to access any item of data (such as a tree node) on such a storage device is dominated by the "seek" time required for the storage unit to physically locate the desired storage address. Following each seek, the contents of a node may be read into the high-speed memory of the computer system. In a simple binary tree, for each access of a node, only a two-way decision (to the left or right branch from that node) can be made since the node contains only one search key.

If instead of containing only one search key per node, a node contains several search keys, then for each seek operation, several keys will be read into the high speed memory of the computer system. With one search key per node, a comparison and determination can be made that the item sought for is in one half of the remainder of the tree. With "n−1" search keys per node, the search can be narrowed to "1/n" of the remainder of the tree. This type of structure is known in the prior art as a "multi-way" tree.

It is advantageous to have as many search keys as possible per node. Thus, for each seek of a node, several search keys can be examined and a more efficient determination can be made as to the location of the next node or, in the case of a leaf node, of a data record. The height of the tree, and hence the search time, is dramatically decreased if the number of search keys per node is increased.

In many prior art systems, a number of complete search keys, along with their associated pointers, are stored in each node of a search tree. For example, in the IBM System/34 computer, each node is 256 bytes long, corresponding to that computer system's magnetic disk sector size. In this example computer system, the maximum key length permitted is 29 bytes. Using 3-byte relative record numbers for pointers, the maximum number of search keys that can be inserted into each node of that system is eight. Thus, for that computer system, it would be very advantageous to devise a search tree structure that contained more than eight search keys per node.

The present system provides just such an improved tree structure, using a variation of the B-tree called a "Bit-tree". A Bit-tree is similar to a B-tree in that it consists of leaf nodes and branch nodes, with one of the nodes in the tree being the root node. In the present invention, branch nodes are essentially identical to branch nodes in a standard B-tree. (In the preferred embodiment of the invention, the root node cannot be any larger than any other branch node.) For the sake of example only, the inventive Bit-tree system is described in terms of its implementation on an IBM System/34 computer Thus, each node is 256 bytes long, and the inventive system uses 3-byte relative record numbers for pointers. Thirteen bytes per node are used for system information purposes. The remaining 243 bytes of each node can be used for search keys and their associated relative record numbers. If "k" is the length of a search key, then the maximum number of search keys per node is $243/(k+3)$. The maximum number of maximum length search keys per branch node is therefore seven ($k=29$ bytes).

The principal difference between the inventive Bit-tree and standard B-trees is the use of "distinction bits" in place of search keys in all leaf nodes. A distinction bit is determined by comparing two search keys, and calculating the ordinal number of the first bit that is different between the two keys. (In the preferred embodiment, the binary number "1000" is added to each distinction bit in order to simplify the search method). In the example under consideration, the maximum search key length permitted is 29 bytes, and since there are eight bits per byte, the maximum length of a search key is 232 bits. Thus, the ordinal number representing any one of those 232 positions need only be eight bits, or one byte, in length (even taking into account the 8-count displacement added into each distinction bit).

In each leaf node, instead of search keys, distinction bits along with their associated relative record numbers are inserted. In the example computer system, the maximum number of distinction bit entries plus relative record numbers in a leaf node is therefore 243/(1+3), or 60, regardless of the length of the actual key itself. This use of distinction bits is the principal advantage of Bit-trees. Since almost all nodes in a tree structure are leaf nodes, and since Bit-tree leaf nodes contain more entries than nodes containing standard search keys, there are fewer nodes in the tree to seek and read. Further, less storage space is required for the tree itself, since more information is packed into fewer leaf nodes. Thus, a computer system using the present invention for a search tree structure is significantly more efficient than prior art B-tree search tree structures.

SUMMARY OF THE INVENTION

In the preferred embodiment of the invention, the search keys are divided up in a chosen order into a tree structure, with the root node and all of the branch nodes of the tree structure being assigned search keys with their associated pointers. An indication flag is set for the root node and each branch node to indicate their status as such. For those search keys that would normally "point" to data records, a special routine is performed that calculates the distinction bit (including an additional binary "1000") between each ordered pair of search keys. The distinction bit corresponding to each search key is then entered into a leaf node, along with its associated pointer To search the Bit-tree for the existence in the data base of a data record having a particular key ("KEY"), the computer system traces from the root node along the branch nodes in known fashion, comparing KEY with the search keys in selected branch nodes. In the preferred embodiment, if KEY is both (a) greater than or equal to a search key, and (b) less than the next search key, the pointer located between the two search keys is selected and used to access the next branch node or a leaf node. If KEY is less than the first search key in a branch node, then the first pointer in the node is used to select the next node. If KEY is equal to or greater than the last search key in a node, then the last pointer in the node is used to access the next node.

Once the Bit-tree has been traversed down to a leaf node, certain bits of KEY corresponding to selected distinction bits in the leaf node are examined to determine whether they are a binary "1" or "0". If the first bit that is examined in KEY is a binary "1", the pointer associated with the first distinction bit is temporarily saved. This indicates that KEY is similar in the examined bit position to the actual search key associated with that particular distinction bit. Thus, the search key associated with the current distinction bit may be a match for KEY. The bit in KEY corresponding to the next distinction bit in the leaf node is then examined.

If a bit in KEY indicated by a distinction bit in the leaf node is equal to binary "0", this indicates that the search key associated with that distinction bit is dissimilar from KEY in the examined bit position. In building the Bit-tree, the distinction bits corresponding to search keys are inserted in ascending order into each leaf node. Thus, any subsequent distinction bit in the leaf node greater in value to this current distinction bit necessarily indicates its associated search key is more dissimilar from KEY than the search key associated with the current distinction bit. Therefore, the leaf node is examined for a subsequent distinction bit having a value less than the current distinction bit. Upon finding a lesser distinction bit, the examination of bits in KEY is continued as above. At the end of the distinction bits in the leaf node, the last pointer temporarily saved points to a data record that corresponds to either KEY, or to the position where the data record associated with KEY would be if it existed in the data base.

It cannot be determined if the data record corresponding to KEY is in the data base without attempting to read the data record "pointed" to as a result of the above search. However, in any tree-structure index system, searching for data in a file requires a read operation of the data record in any event. Since it is necessary to read the data record anyway, in the present system the data record is read and KEY is compared with the search key ("KEYR") stored in the data record. Either a "found" or "not found" status for the data record is then indicated.

When inserting data into a file, the Bit-tree method requires an extra read operation compared to the prior art. However, inserts are normally much less frequent in practice than retrieval of data, so that the time saved due to using fewer nodes in the Bit-tree structure of the present invention more than makes up for the occurrences of such extra read operations. Further, since the tree height is typically less in a Bit-tree than in traditional B-trees, and hence fewer nodes have to be read, there may not in fact be an extra read operation overall in comparison to the prior art.

If as a result of a "not found" condition in the data base, a data record is to be added to the data base, then the new data record is written in known fashion at the location designated by the next available relative record number, and the value of the relative record number is saved temporarily. The distinction bit of the search key for the data record is determined and inserted into a leaf node.

If, during the course of a search where an insert operation may be performed, any full node is detected, it is split into two nodes, and a linkage is made to the two new nodes from the parent branch node of the old node.

The details of one embodiment of the present invention are set forth below. Once the details of the invention are known, numerous additional innovations and changes will become obvious to one skilled in the art.

BRIEF DESCRIPTION OF THE DRAWINGS

The invention will become better understood by reference to the following detailed description when taken in conjunction with the accompanying drawings showing the preferred embodiment of the invention.

Like numbers and designations in the drawings refer to like elements.

DETAILED DESCRIPTION OF THE INVENTION

Throughout this description, the preferred embodiment and examples shown should be considered as exemplars, rather than limitations on the method of the present invention.

Figure 1:
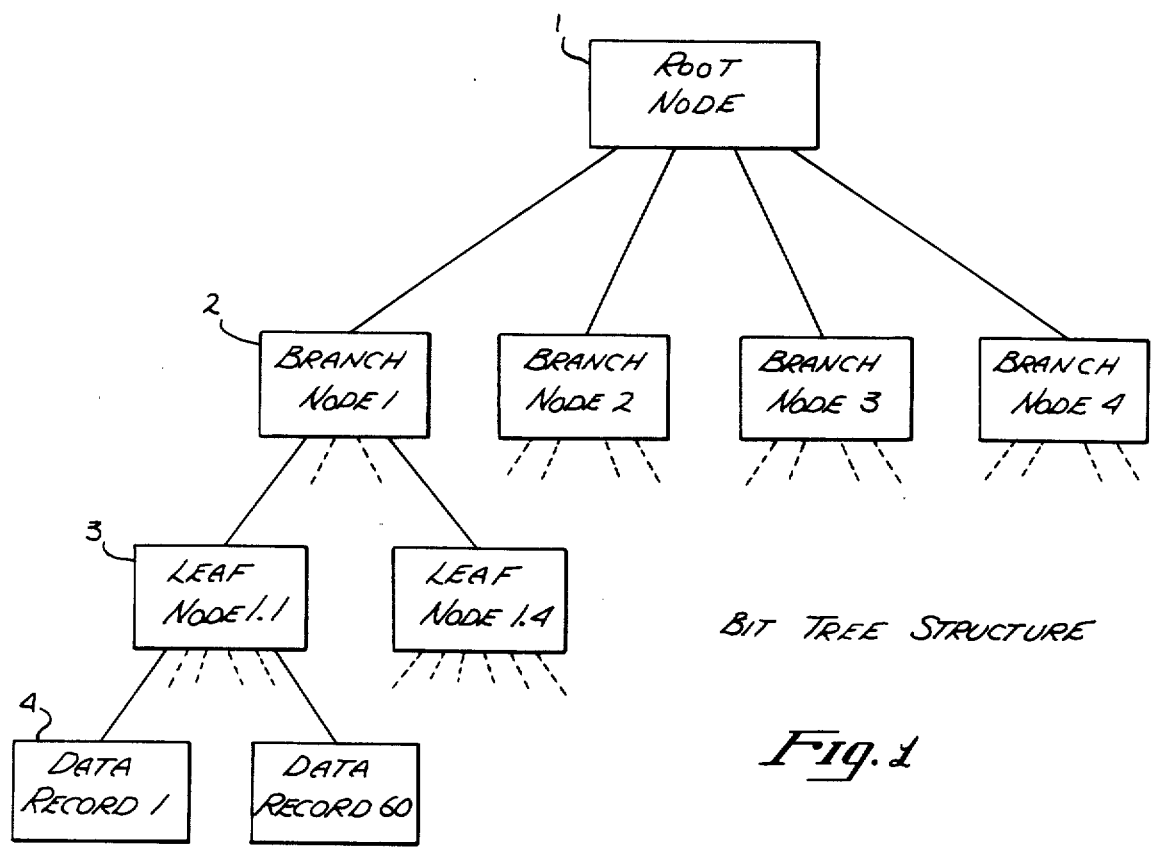
FIG. 1 is schematic diagram of a Bit-tree index structure for data records stored in a computer storage system.

FIG. 1 is a diagram of a partial multi-way Bit-tree in accordance with the present invention. The Bit-tree shown has a height of three, corresponding to a root node 1, one level of branch nodes 2, and one level of leaf nodes 3. The height of a Bit-tree varies depending on the number of data records 4 to be indexed within the leaf nodes of the Bit-tree, and upon the length of the keys in the branch nodes. Although only four branch nodes are shown in FIG. 1, the number of branch paths from a node will vary in practice. For example, in the preferred embodiment, when implemented on the example computer system, the maximum number of branch paths from any root node or branch node is seven when a 29-byte key length is selected (unless the root node is the only node). In that same embodiment, the maximum number of branch paths from a leaf node is sixty.

FIG. 1 is outwardly similar to the structure of a standard B-tree, except that in a standard B-tree, the number of branch paths from each leaf node would be approximately the same as the number of branch paths from any branch node or the root node. The advantage of the present invention over the prior art is the substantially higher density of search information that can be stored in each leaf node. With higher density leaf nodes, the height of the tree for any particular data base is less than the height of the corresponding standard B-tree. The reduced height of the Bit-tree therefore requires fewer READ operations of the computer storage system in traversing the branch paths of the tree structure in comparison to the prior art. Further, the denser leaf nodes permit a greater number of branching decisions to be made after reading a leaf node in comparison to the prior art.

Figure 2A:
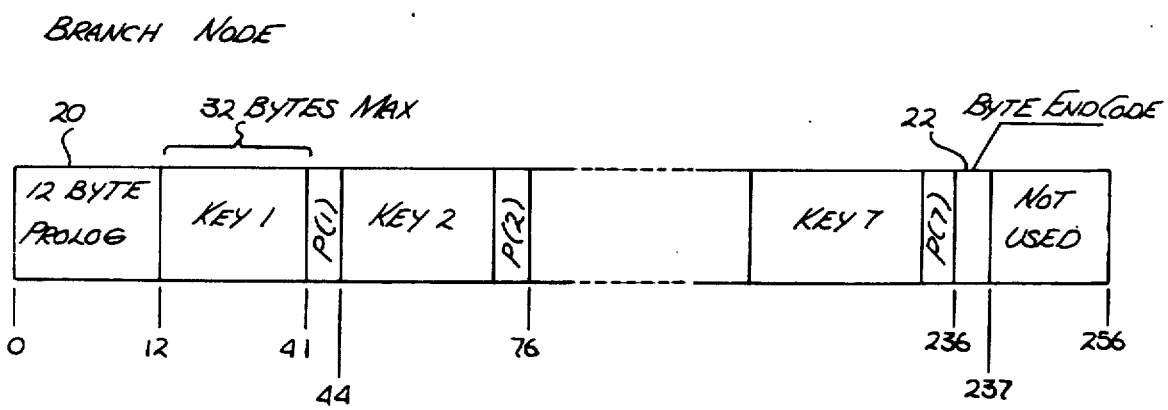
FIG. 2a is a diagram of the structure of a branch node of a Bit-tree.

In order to fully understand the present method, the structure of branch nodes and leaf nodes should be well understood FIG. 2a is a diagram of the format of a branch node. In the preferred embodiment, as configured for the example computer system, each node is 256 bytes long. The first twelve bytes of each branch node comprise a Prolog 20 dedicated to system information. The remainder of each branch node is dedicated to pairs of search keys (such as Key1 and Key2, shown in FIG. 2a), and their associated pointers (such as P(1) and P(2)). In the preferred embodiment as implemented on the example computer system, the maximum length of each key is 29 bytes, and the pointers comprise 3-byte relative record numbers. Hence, only seven maximum length keys and associate pointers can be stored in each branch node. If the search keys are of lesser length, the branch nodes can contain more than seven search keys.

At the end of the last pointer in each branch node, a one-byte END CODE 22 comprising a hexadecimal "FF" is stored. Because the number of search keys stored in any branch node will vary, the position of this END CODE is a simple way to flag to the computer system that no further information exists in a particular node.

Figure 2B:
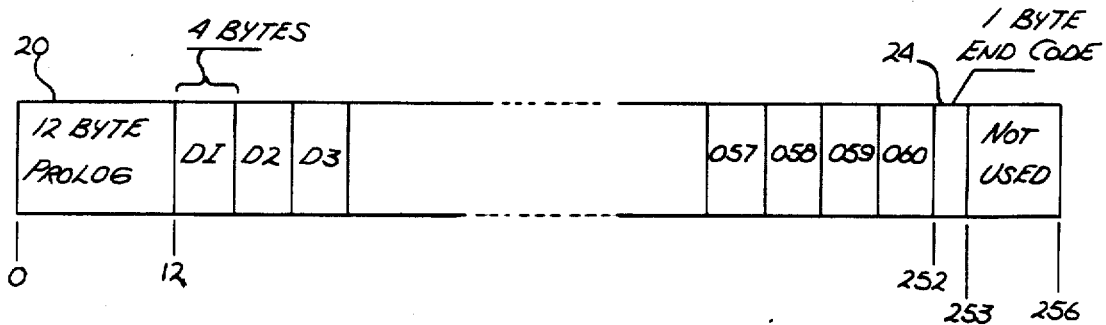
FIG. 2b is a diagram of the structure of a leaf node of a Bit-tree.

FIG. 2b shows the structure of a leaf node in the preferred embodiment. The first twelve bytes of each leaf node contains system information identical in format to the Prolog 20 of the branch nodes. After the Prolog, the leaf node format contains up to sixty 4-byte long sets of distinction bits and associated pointers (such as D1, D2, etc.). At the end of the last distinction bit and associated pointer in each leaf node, a one-byte END CODE 24 comprising a binary "0" is stored.

Figure 3:
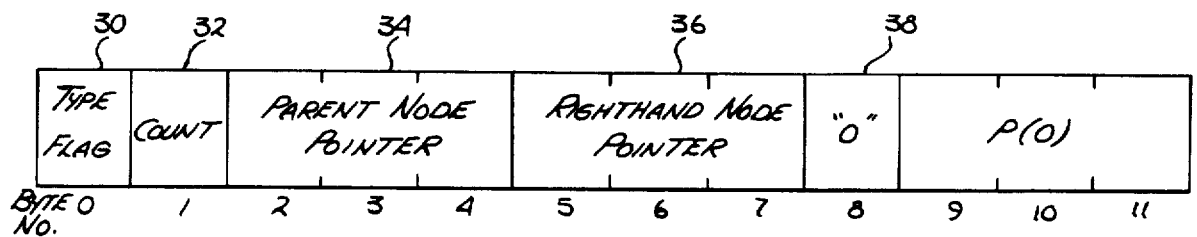
FIG. 3 is a diagram of an expanded structure of the Prolog portion of a node of a Bit-tree.

FIG. 3 shows an expanded format for a node, disclosing details of the Prolog for each node. In the preferred embodiment, the first byte of the Prolog is a TYPE FLAG 30, which indicates whether the node is a leaf node or a branch node. The second byte of the Prolog contains a variable called COUNT 32, used for keeping track of the number of search keys or distinction bits in a particular node.

The next three bytes are used to store a pointer 34 to the "parent" node of a particular node. This pointer 34 permits reference to the parent node when the lower node has to be split into two parts.

The next three bytes consist of a pointer 36 to the logically adjacent righthand node. This permits the Bit-tree structure to be used for indexed sequential processing, in known fashion.

The next byte contains a marker flag 38 comprising a binary "0". This indicates to the computer system the beginning of the first pointer in the node and simplifies the insertion of new search keys or distinction bits.

The last three bytes of the Prolog comprise the first pointer, P(0), in the node, which points to a lower node (either a branch node or a leaf node). Each node contains one more pointer than the number of search keys or distinction bits. Each search key or distinction bit thus serves as a comparison point, from which a two way decision—either to its lefthand pointer or to its righthand pointer—is made.

Figure 4:
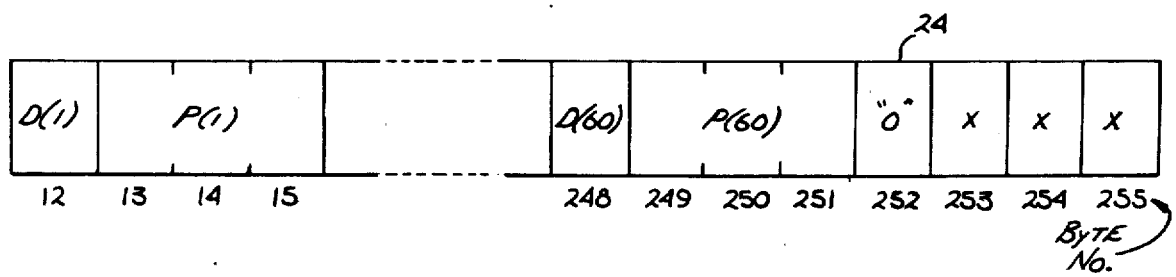
FIG. 4 is a diagram of an expanded structure of the format of a leaf node in a Bit-tree.

FIG. 4 shows in expanded detail the format of a leaf node of a Bit-tree. A one-byte distinction bit (such as D(1)) and an associated 3-byte pointer (such as P(1)) are stored in 4-byte segments of the node. Thus, up to sixty distinction bits and pointers can be stored in each leaf node in the present example. As noted previously, at the end of the last pointer a binary "0" is stored as the END CODE 24.

In the preferred embodiment of the invention, a search key for each data record in a data base is created in known fashion. The search key is usually a data field such as a name or account number. Each data record contains a copy, KEYR, of its search key. The individual data records of the data base may be randomly located in the computer storage system. The search keys for each of the data records are assigned pointers in known fashion that indicate the location in the computer storage system for the associated data record. Thus, in searching for a particular data record, the computer need only manipulate the search keys and associated pointers, which comprise a volume of data that is substantially less than the volume of information in the data base.

The search keys, along with their associated pointers, comprise an index to the data base. To build the Bit-tree, a first empty node is created in known fashion. Individual search keys are then inserted into the Bit-tree in the manner described below. When the first node is full, the node is split into two parts in the manner described below. Thus, building of the Bit-tree is a matter of repeated application of the insert and node splitting methods used for entering new index references into an established Bit-tree.

Once distinction bits are determined for each of the search keys logically assigned to each leaf node, the distinction bits for the search keys, along with their associated pointers, are stored in the leaf node in lieu of the search keys themselves. Since each distinction bit and associated pointer comprise only four bytes in the preferred embodiment, up to sixty distinction bit and pointer sets may be stored in each leaf node in the illustrative example. The high density of distinction bits in each leaf node provides the primary advantages of the present invention over the prior art.

The present invention comprises three parts: First, a method for searching through the Bit-tree; second, a method for inserting search keys or distinction bits into the Bit-tree; and third, a method for splitting nodes of the Bit-tree when they can contain no further search keys or distinction bits.

Searching the Bit-tree

Figure 5:
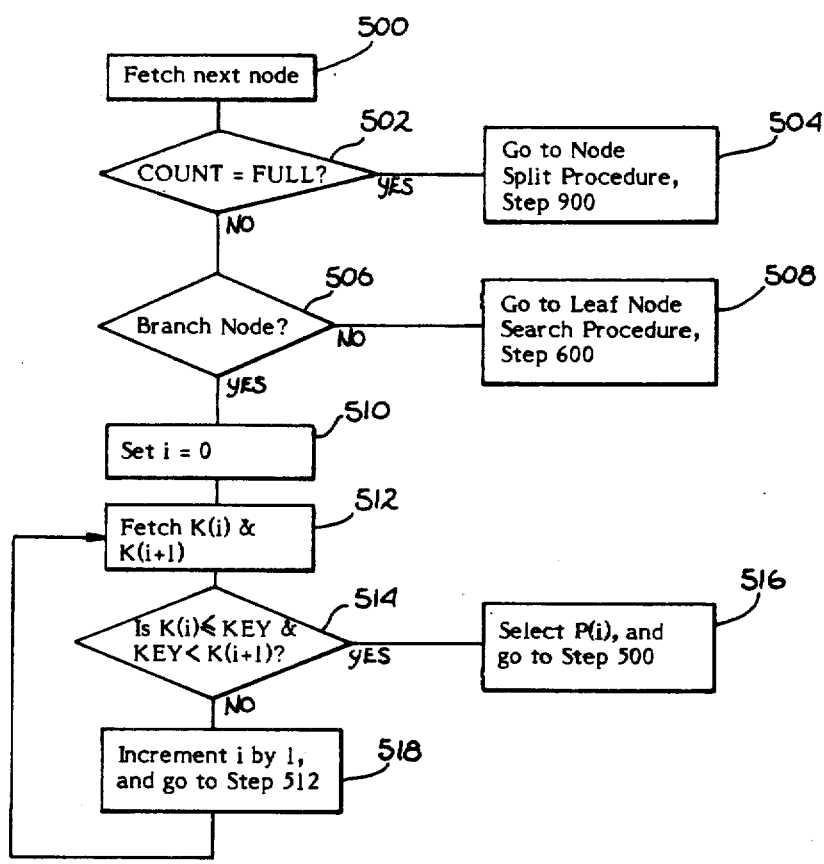
FIG. 5 is a flow chart of the Branch Node Search Procedure of the present invention.
Figure 6:
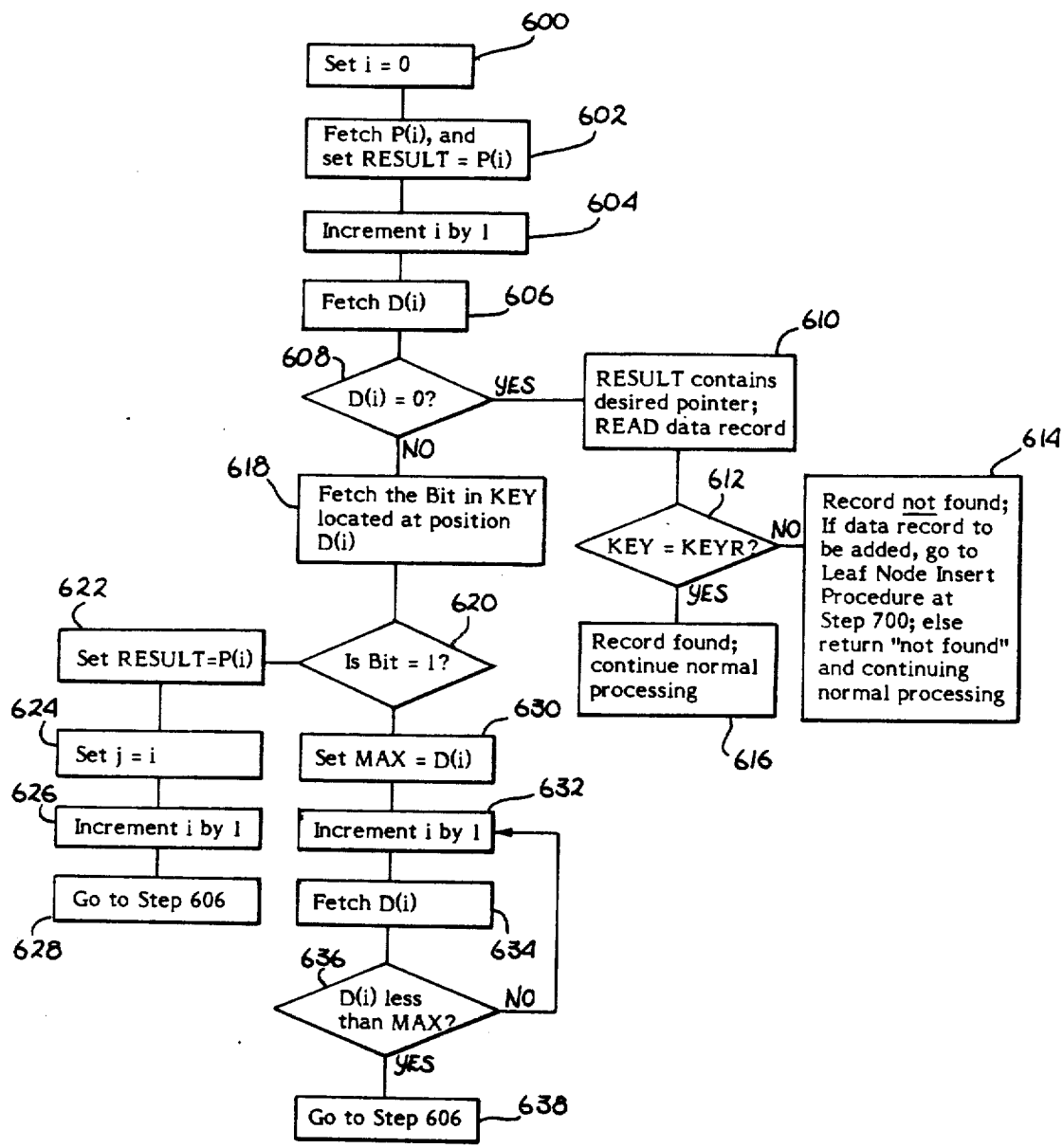
FIG. 6 is a flow chart of the Leaf Node Search Procedure of the present invention.

Once the Bit-tree is constructed, the Bit-tree is used in a manner similar to the standard B-tree as a search index to data records in computer storage system. FIGS. 5 and 6 show flow charts describing the use of the Bit-tree to search for data records. If it is desired to access a record (which may or may not actually exist in the data base) having a search key of KEY, the procedure shown in FIG. 5 is initially followed. The process steps are as follows:

Step 500: Beginning with the root node, the computer system fetches the next node.

Step 502: The COUNT variable in the node Prolog is compared to a variable FULL, which contains the maximum node length permitted in a particular computer system.

Step 504: If the node is full, the node must be split into two parts, and the Node Split Procedure (shown in FIG. 9) is accessed.

Step 506: If the node is not full, the TYPE FLAG in the Prolog of the node is examined to determine whether the node is a branch node or a leaf node.

Step 508: If the node is a leaf node, the Leaf Node Search Procedure shown in FIG. 6 is begun.

Step 510: If the node is a branch node, the search procedure shown in FIG. 5 is continued by setting a temporary index variable, "i", to "0".

Step 512: An ordered pair of search keys, K(i) and K(i+1), are fetched from the node for comparison with KEY. (The search key, K(0), is the marker flag 38 from the Prolog of the node).

Step 514: If KEY is greater than or equal to search key K(i), and less than search key K(i+1), then Step 516 is performed.

Step 516: Pointer P(i) is selected and used as the pointer to the next node. The Branch Node Search Procedure beginning at Step 500 is again applied to locate either the next branch node or a leaf node.

Step 518: If no successful comparison is made, the procedure loops to Step 512. In this manner, all of the keys in the current branch node can be examined and compared with KEY to find the appropriate pointer to the next branch or leaf node.

The eventual outcome of the Branch Node Search Procedure is a pointer to a leaf node. Once a leaf node is selected, the Leaf Node Search Procedure shown in FIG. 6 is followed to determine which distinction bit in the leaf node is to be selected for the particular KEY in consideration.

The steps shown in FIG. 6 in detail are as follows:

Step 600: A temporary variable, "i", is set to "0".

Step 602: The first pointer, P(0), is fetched from the leaf node, and a temporary variable RESULT is set to the value of P(0).

Step 604: The temporary variable "i" is incremented by one.

Step 606: A distinction bit, D(i), is fetched from the leaf node.

Step 608: If the value of D(i) is equal to "0", the END CODE for the node, then the contents of variable RESULT contains the desired pointer.

Step 610: If the result of Step 608 is that RESULT contains the desired pointer, then the data record indicated by this pointer is read.

Step 612: The data record search key, KEYR, of the data record fetched is compared to KEY.

Step 614: If the result of the comparison in Step 612 is that KEY does not equal KEYR, then the desired data record does not exist in the data base. If it is desired to add the data record having the search key of KEY, then the system goes to the Leaf Node Insert Procedure shown in FIG. 7. Otherwise, the system returns to the user a designation of "not found" for the data record, and processing continues in a normal fashion.

Step 616: If the comparison of Step 612 shows that KEY equals KEYR, the data record is found and may be used for normal processing.

Step 618: If the result of Step 608 was that the node END CODE had not been fetched, then D(i) is a valid distinction bit. Using this value, the value of the bit in KEY located at position D(i) is fetched. (Actually, the value [D(i)−binary "1000"] is used in the preferred embodiment. For example, if D(i) equals decimal 49, then the 41st bit in KEY is fetched. However, for clarity, the term "D(i)" will be used to denote this adjusted value).

Step 620: The D(i)'th bit of KEY is examined to determine whether it equals "1".

Step 622: If the result of Step 620 is "yes", then the variable RESULT is set equal to pointer P(i). The equality of the D(i)'th bit of KEY to "1" means that the search key associated with the i'th distinction bit has a "1" in the D(i)'th position as well. This test does not conclusively show that KEY is equal to the search key corresponding to the i'th distinction bit, but it does show that KEY may be a match for that search key. Thus, the pointer P(i) associated with the i'th distinction bit points to a data record having a search key that is a closer match to KEY than the search keys associated with any preceding distinction bit.

Step 624: A temporary index variable, "j" is set equal to the current value of "i". This step is not needed for the search procedure, but simplifies the insert procedure shown in FIG. 7.

Step 626: The value of the index variable "i" is incremented by one.

Step 628: The Leaf Node Search Procedure, beginning at step 606, is again used to process the next distinction bit.

Step 630: If the result of the comparison in Step 620 is that the D(i)'th bit of KEY is equal to "0", a temporary variable, MAX, is set equal to the value of the current distinction bit, D(i). The fact that the D(i)'th bit of KEY is not equal to "1" indicates that the search key corresponding to the i'th distinction bit has a "1" in the D(i)'th position, while KEY does not. This indicates that KEY must differ from the search key associated with the i'th distinction bit at a lower bit number. This is so because the process used for determining the value of a distinction bit for a search key necessarily requires that the distinction bit designate a bit position in the search key where the binary value is "1". Therefore, unless a succeeding distinction bit in the leaf node has a value less than the current distinction bit, the last pointer saved in RESULT indicates the data record having a search key that is closest to KEY.

Steps 632, 634, and 636: These steps cause the succeeding distinction bits in the node to be searched to find one having a value less than the distinction bit value temporarily stored in MAX in Step 630. The index variable "i" is incremented by one, and the next distinction bit is fetched. The i'th distinction bit is tested to see if it is less than MAX. If not, the process beginning at Step 632 is reiterated.

Step 638: If the i'th distinction bit is less than MAX, the Leaf Node Search Procedure is reiterated beginning at Step 606.

The above search method will eventually determine which pointer in the leaf node indicates the data record in the computer storage system that is closest to KEY. It may be noted that the search procedure for leaf nodes requires that all distinction bits in the node must be examined regardless of which pointer is selected. Further, when a pointer is finally selected, it is not known at that time whether or not the data record corresponding to KEY is in the computer storage system. It is only established that if this data record is in the storage system, the pointer selected is the correct one. Thus, the present invention teaches away from the prior art in that all of the entries in a leaf node must be examined to determine the proper pointer (whereas, in the prior art, on average only one-half of the entries of a leaf node need be examined). The search procedure also does not determine at the leaf node level whether a data record corresponding to KEY exists in the computer storage system. However, in the prior art, most often accesses to a data base are for retrieval of data rather than for insertion of data. Therefore, the data record usually must be read in any event. The requirement of the present invention of reading the data record and comparing KEY to KEYR thus does not entail any significant penalty in processing time compared to the prior art for retrieval of data records. Moreover, since more distinction bits are packed into each leaf node in the present invention compared to the number of search keys packed in leaf nodes in the prior art, fewer "seeks" are required when traversing the Bit-tree. That is, the height of the Bit-tree is less than the height of a corresponding B-tree in most instances. Therefore, even in inserting data records using the present invention, quite often in practice the number of READ operations from the root node of the Bit-tree to a data record is no greater than the number of READ operations in a standard B-tree for an insertion of a data record. Thus, since the majority of accesses to the data base are for retrievals of data records only, the present method of structuring and using a Bit-tree rather than a B-tree can substantially increase the processing speed of a computer system.

Inserting Into the Bit-tree

If, after a search for KEY, a record is not found, and it is desired to add the data record to the data base, then an insert procedure must be performed on the appropriate leaf node. Since an insert is preceded by a search, and the search only tests certain bits of KEY, it is possible that other bits in KEY may be equal to "1", which affects the correct position of the new entry in the leaf node. However, the Branch Node Search Procedure does guarantee that once a leaf node has been selected, if KEY exists in the data base, the leaf node selected is the proper one, and if KEY does not exist in the data base, then it still belongs in the selected leaf node.

The essence of the insert procedure is to place a new distinction bit, DKEY (corresponding to KEY), in the proper place either to the left or to the right of the distinction bit corresponding to the data record search key, KEYR. The distinction bit for KEYR is D(j), where "j" has the last value set during the Leaf Node Search Procedure shown in FIG. 6.

If KEY is greater than KEYR, then the distinction bit DKEY and a new pointer, NEW, are inserted in the leaf node immediately to the left of the smallest distinction bit on the righthand side of the distinction bit for KEYR. If KEY is less than KEYR, then DKEY is inserted in the node between the smallest distinction bit on the lefthand side of the distinction bit for KEYR and that distinction bit's associated pointer. The new pointer, NEW, is then inserted between this smallest distinction bit and DKEY.

Figure 7:
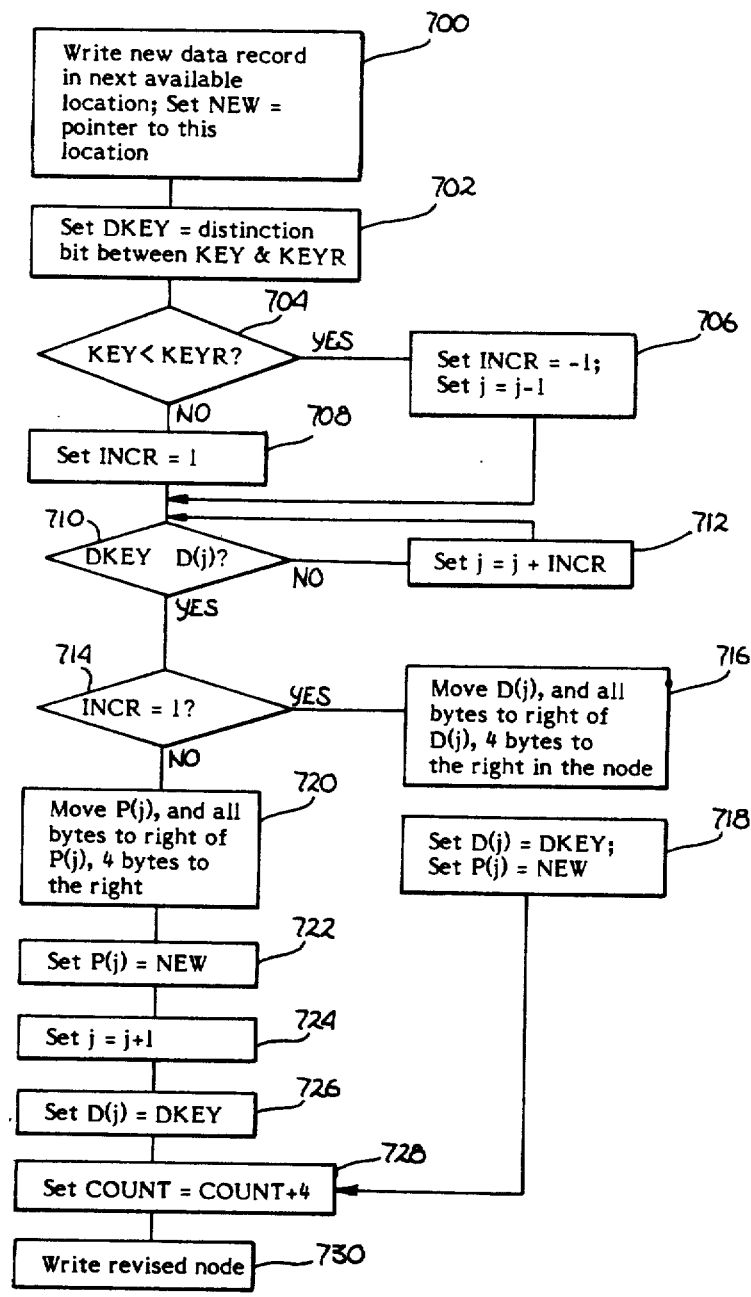
FIG. 7 is a flow chart of the Leaf Node Insert Procedure of the present invention.

FIG. 7 is the flow chart for the Leaf Node Insert Procedure, and comprises the following steps:

Step 700: The new data record is written in the next available location in the computer storage system, in known fashion. A temporary variable, NEW, is set to the value of the pointer for this location.

Figure 8:
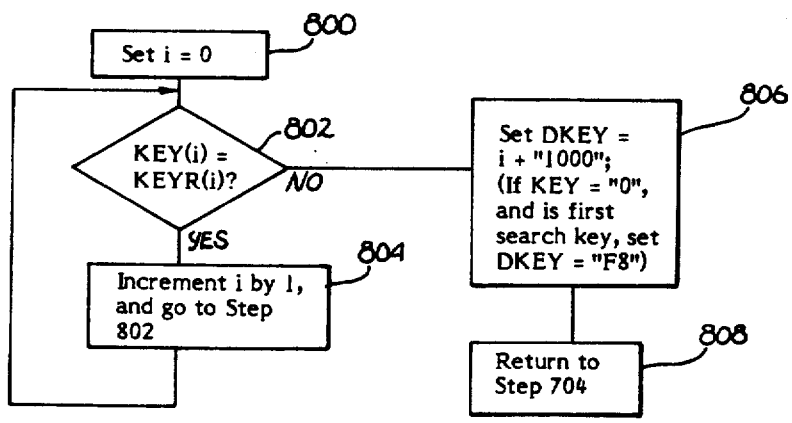
FIG. 8 is a flow chart of the Distinction Bit Computation Procedure of the present invention.

Step 702: A temporary variable, DKEY, is set equal to the distinction bit between KEY and KEYR (the method for determining the distinction bit is shown in FIG. 8).

Step 704: A test is made to see whether KEY is less than KEYR. This indicates whether DKEY will be inserted to the left or right of the distinction bit in the leaf node corresponding to KEYR.

Step 706: If KEY is less than KEYR, DKEY is to be inserted into the left of the distinction bit for KEYR. A temporary variable, INCR, thus is set equal to "−1", and the temporary variable "j" (obtained from the Leaf Node Search Procedure shown in FIG. 6) is decremented by "1". The process then continues at Step 710.

Step 708: If KEY is greater than or equal to KEYR, then DKEY is to be inserted to the right of the distinction bit for KEYR, and the temporary variable INCR is set equal to "1".

Step 710: DKEY is tested to see whether it is greater than D(j).

Step 712: If DKEY is not greater than D(j), then "j" is set equal to (j+INCR), and Step 710 is repeated.

Step 714: If DKEY is greater than D(j), a test is made to see whether INCR is equal to "1".

Step 716: If INCR equals "1", then the current distinction bit, D(j), and all bytes of information in the node to the right of D(j), are moved four bytes to the right. This permits insertion in the proper place in the leaf node of the new pointer and distinction bit.

Step 718: In the position for the j'th distinction bit, the new distinction bit, DKEY, is inserted; and the pointer, P(j), associated with the current distinction bit position is set to the value of NEW. The insert procedure then continues at Step 728.

Step 720: If INCR is not equal to "1", then the current pointer, P(j), and all bytes in the leaf node to the right of P(j), are moved four bytes to the right. This allows room for the new pointer and distinction bit.

Step 722: In the position of the current pointer, P(j), the value in NEW is stored.

Step 724: The value of the index pointer "j" is incremented by one.

Step 726: Using the new value for the index pointer "j", DKEY is inserted in the distinction bit position D(j).

Step 728: After the new distinction bit, DKEY, and the new pointer, NEW, are stored in the node, the COUNT variable in the node Prolog is incremented by four, showing that the length of the node has increased by four bytes.

Step 730: The revised leaf node is written into the computer storage system, and the Leaf Node Insert Procedure is completed.

The Distinction Bit Computation Procedure referenced in FIG. 7 is shown in detail in FIG. 8. The steps for this procedure are as follows:

Step 800: A temporary index variable, "i", is set to "0".

Step 802: The two search keys, KEY and KEYR, are compared bit by bit to determine the ordinal number designating the first bit position between the two search keys that is different.

Step 804: If the two search keys do not differ in a bit position, the index variable "i" is incremented by one, and the Distinction Bit Computation Procedure continues again at Step 802.

Step 806: When the ordinal number designating the first bit position in the two search keys that differs in value is determined, the binary number "1000" is added to that ordinal number, and the result is designated as the distinction bit, DKEY, for KEY. This addition of a binary "1000" insures that the distinction bit used in the search method of the present invention can never equal the value "0". Although not necessary to the essence of the present invention, this technique of offsettinq the distinction bit by a known value simplifies certain portions of the search method by permitting the value "0" to be used as a flag bit. In computing distinction bits, a special case exists when the first search key is equal to "0".

In that case, the distinction bit corresponding to the first search key is set to the hexadecimal number "F8", which exceeds any other possible distinction bit value.

Step 808: Processing continues again at Step 704 in FIG. 7.

Node Splitting

When a node becomes full, it must be split into two nodes with an entry (the Split Key) being inserted, or "pushed up," into the node's parent node. When the root node splits, the tree increases in height by one level. When a leaf node splits, it is necessary to read a data record in order to get the Split Key associated with the distinction bit in the leaf node which is being pushed up into the parent node. In order to save time, a node split operation is performed whenever a node is detected as being full during the Branch Node Search Procedure set forth in FIG. 5. This procedure of splitting a full node while searching "down" the tree prevents having to isolate other users from access to the Bit-tree whenever a node split is required; only the node actually being split must be isolated. Further, the procedure for reading "down" the tree is much simpler to implement than are procedures for reading "up" the tree. Moreover, this procedure always insures that a parent node has the necessary space for storing the Split Key of a node that is being split.

Figure 9:
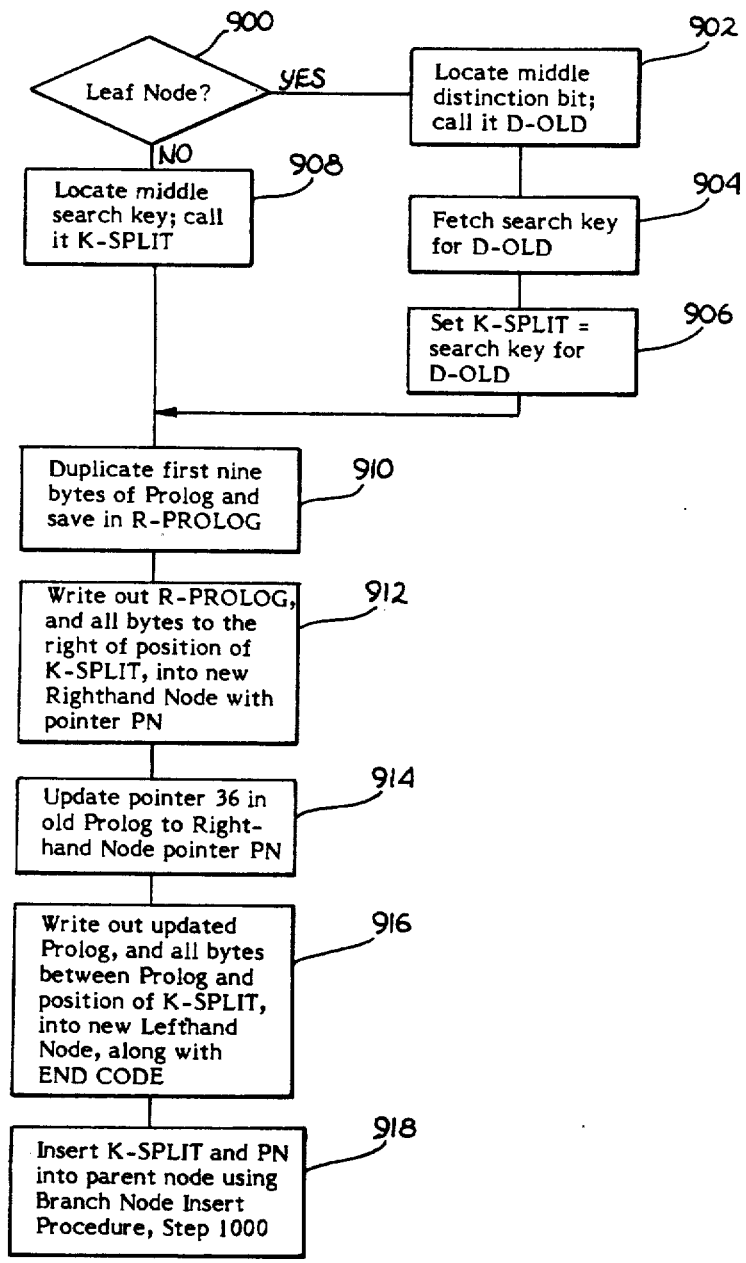
FIG. 9 is a flow chart of the Node Split Procedure of the present invention.

FIG. 9 sets forth the procedure for splitting leaf nodes and branch nodes. The Node Split Procedure is entered from the Branch Node Search Procedure (FIG. 5). The Node Split Procedure comprises the following steps:

Step 900: The node is tested to determine whether it is a leaf node or a branch node.

Step 902: If the node is a leaf node, the node is searched to locate the middle distinction bit, which is designated as "D-OLD". In the preferred embodiment as implemented on the example computer system, the thirty-first distinction bit is selected as D-OLD.

Step 904: Using the pointer associated with D-OLD, the search key associated with D-OLD is fetched from the computer storage system.

Step 906: A temporary variable, K-SPLIT, is set to the value of the search key associated with D-OLD, and processing continues at Step 910.

Step 908: If the node is a branch node, the node is searched to locate the middle search key, which is designated as "K-SPLIT". It should be noted that the ordinal number of the "middle" search key in a branch node will vary depending on the length of the key. For the maximum length key permitted in the preferred embodiment, as implemented on the example computer system, only seven keys per branch node are allowed, and the "middle" search key is the fourth search key in a full node.

Step 910: The first nine bytes of the Prolog for the original node are duplicated and saved temporarily in a variable called R-PROLOG.

Step 912: All of the bytes of R-PROLOG, and all of the bytes to the right of the node position corresponding to K-SPLIT, are written into the computer storage system in a new node having a pointer "PN". The new node is a new Righthand Node.

Step 914: The Righthand Node pointer 36 of the Prolog in the original node is changed to the value of pointer PN.

Step 916: The revised old Prolog, and all bytes of the old node between the Prolog and the node position corresponding to K-SPLIT, are written into the computer storage system, along with a node END CODE (hexadecimal "FF" in the case of a branch node, and "0" in the case of a leaf node). This node comprises a new Lefthand Node.

Step 918: The value of K-SPLIT and PN are inserted into the parent node of the original node using the Branch Node Insert Procedure shown in FIG. 10.

The result of the above steps are that the old node is split into two new nodes, with a search key taken from or derived from the old node used to designate in the Bit-tree structure the location of the two new split nodes.

Figure 10:
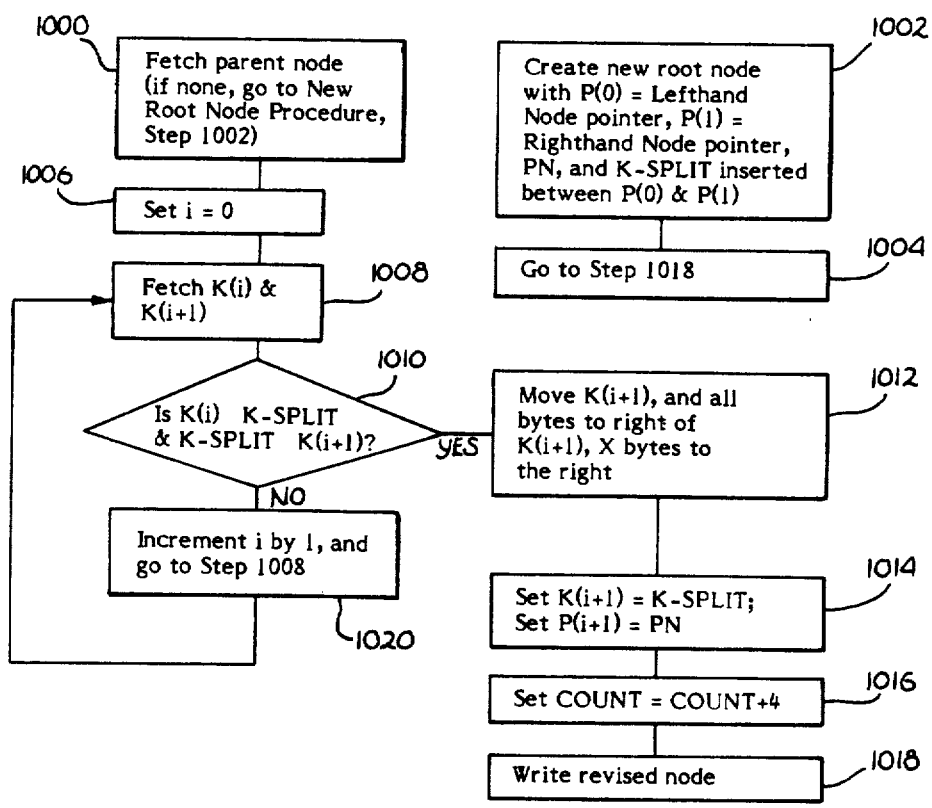
FIG. 10 is a flow chart of the Branch Node Insert Procedure of the present invention.

FIG. 10 shows the Branch Node Insert Procedure used in conjunction with the Node Split Procedure of FIG. 9.

The Branch Node Insert Procedure compares K-SPLIT from the Node Split Procedure in FIG. 9 to the various keys in the parent branch of the node that was split. When the proper position relative to the search keys in the parent node is located, K-SPLIT is inserted into the parent node along with PN, the pointer to the new Righthand Node.

The detailed steps of the Branch Node Insert Procedure are as follows:

Step 1000: The parent node of the split node is fetched using the parent node pointer from the Prolog of the split node. If no parent node exists (because the previous split node was the root node), a new root node routine is accessed (Step 1002).

Step 1002: If a new root node is required, a new node is created and accessed in known fashion, and is designated as the new root node for the Bit-tree. Pointer P(0) in this new node (bytes 9-11 of the node Prolog) is set equal to the pointer for the old root node, and points to the new Lefthand Node. Pointer P(1) is set equal to PN, the pointer to the new Righthand Node. The search key K-SPLIT is inserted between P(0) and P(1).

Step 1004: After the creation of the new root node, the process continues at Step 1018.

Step 1006: A temporary index variable, "i", is set to "0".

Step 1008: The ordered search keys, K(i) and K(i+1), are fetched from the node. (The search key, K(0), is the marker flag 38 from the Prolog of the node. This simplifies the insert procedure).

Step 1010: K-SPLIT is tested to see whether it is greater than or equal to K(i), and less than K(i+1).

Step 1012: If the test in Step 1010 is positive, then K(i+1), and all bytes to the right of K(i+1), are moved X bytes to the right. The value of "X" depends on the length of the key in the particular implementation chosen. For example, if the key length is equal to 29 bytes in the example computer system, then X would equal "29+3", or "32".

Step 1014: K-SPLIT is inserted into position K(i+1) and pointer PN is inserted in position P(i+1).

Step 1016: After the insertion of K-SPLIT and PN into the node, the variable COUNT in the Prolog is set to COUNT+X.

Step 1018: The revised node is written into the computer storage system.

Step 1020: If the result of the test in Step 1026 is negative, then the index variable "i" is incremented by one, and the process reiterates starting at Step 1008.

While a particular embodiment of the invention is described above, it should be understood that changes can be made without departing from the spirit or scope of the invention. For example, in particular computer systems, the length of each branch or leaf node may vary from the example given in the present disclosure. Therefore, more or fewer search keys or distinction bits may be stored in each such node. Further, other values for the arbitrary flags (for example, the END CODE for each node) may be chosen other than those disclosed above. If the length of a search key is greater than 256 bits, then the distinction bits may comprise two bytes rather than one byte. Moreover, many of the inventive concepts shown in the flow chart figures can be rearranged in order such that the same functions are accomplished without departing from the essence of the inventive method. Therefore, this invention is not to be limited to the specific embodiments discussed and illustrated herein, but rather by the following claims.

I claim:

1. In a computer system comprising a data processing means, a memory means, and a data storage device containing data records, each data record having a unique search key and a unique record location reference, wherein the data records are indexed by means of a multi-way tree structure initially stored in the data storage device and having at least one leaf node, each such leaf node initially having a plurality of ordered copies of certain of the search keys assigned thereto and containing associated record location references, a method of operating the data processing means for compactly storing indexing information in each leaf node, comprising the steps of:

(1) reading a selected leaf node from the data storage device and saving the leaf node in the memory means;

(2) comparing an initial search key assigned to the leaf node to a next search key assigned to the leaf node;

(3) determining a distinction bit, comprising the ordinal number of the bit position in the initial and the next search keys in which the two keys differ in value;

(4) saving the distinction bit, and the record location reference associated with said next search key, in the leaf node located in the memory means; and (5) repeating Steps (2), (3), and (4) for a next pair of search keys assigned to the leaf node until a distinction bit is determined and the distinction bit and its associated record location reference are saved for each successive pair of search keys assigned to the leaf node.

2. In a computer system comprising a data processing means, a memory means, and a data storage device containing data records, each data record having a unique search key and a unique record location reference, wherein the data records are indexed by means of a multi-way tree structure initially stored in the data storage means and having (a) a plurality of leaf nodes, each having a unique leaf location reference and each having assigned thereto a plurality of (1) ordered distinction bits, each distinction bit comprising the ordinal number of the bit position in an ordered pair of search keys in which the two keys differ in value, the search keys corresponding to certain of said data records, and (2) record location references, each record location reference being associated with a distinction bit, and (b) at least one branch node, each such branch node having a unique branch location reference, and each branch node containing a plurality of ordered copies of certain of the search keys and associated branch location references to other branch nodes and/or leaf location references to leaf nodes, a method of operating the data processing means for locating a desired data record having a selected search key, comprising the steps of:

(1) selecting the leaf node associated with the selected search key of the desired data record from the data storage device, and saving the selected leaf node in the memory means;

(2) fetching from the selected leaf node an initial distinction bit;

(3) comparing the bit position in the selected search key corresponding to the ordinal value of the fetched distinction bit to a selected value;

(4) if the comparison of Step (3) results in equality, then:
  (a) saving the record location reference associated with the fetched distinction bit;
  (b) fetching a next distinction bit from the selected leaf node; and
  (c) continuing at Step (3) until all distinction bits in the leaf node have been compared;
(5) if the comparison of Step (3) results in inequality, then:
  (a) saving the value of the fetched distinction bit;
  (b) fetching a next distinction bit from the selected leaf node;
  (c) if the fetched distinction bit is greater than the saved distinction bit, then continuing at Step (5) (b);
  (d) if the fetched distinction bit is not greater than the saved distinction bit, then fetching a next distinction bit from the selected leaf node and continuing at Step (3);
wherein the last saved record location reference indicates the location in the computer system of the desired data record.

3. In a computer system comprising a data processing means, a memory means, and a data storage device containing data records, each data record having a unique search key and a unique record location reference, wherein the data records are indexed by means of a multi-way tree structure initially stored in the data storage device and having (a) a plurality of leaf nodes each initially having a plurality of ordered copies of certain of the search keys assiged thereto and containing associated record location references, each leaf node having a unique leaf location reference, and (b) at least one branch node, each such branch node having a unique branch location reference, and each branch node containing a plurality of ordered copies of certain of the search keys and associated branch location references to other branch nodes and/or leaf location references to leaf nodes, a method of operating the data processing means for compactly storing indexing information in each leaf node for enabling rapid searching of said data records, comprising the steps of:
  (1) reading a selected leaf node from the data storage device and saving the leaf node in the memory means;
  (2) comparing an initial search key assigned to the leaf node to a next search key assigned to the leaf node;
  (3) determining a distinction bit, comprising the ordinal number of the bit position in the initial and the next search keys in which the two keys differ in value;
  (4) saving the distinction bit, and the record location reference associated with said next search key, in the leaf node located in the memory means in a position corresponding to the ordering of said next search key assigned to that leaf node; and
  (5) repeating Steps (2), (3), and (4) for a next pair of search keys assigned to the leaf node until a distinction bit is determined and the distinction bit and its associated record location reference are saved for each successive pair of search keys assigned to the leaf node.

4. The method of operating the data processing means of claim 3, further comprising a step of locating a desired data record having a selected search key, the locating step further comprising the steps of:
  (1) selecting the leaf node associated with the selected search key of the desired data record from the data storage device, and saving the selected leaf node in the memory means;
  (2) fetching from the selected leaf node an initial distinction bit;
  (3) comparing the bit position in the selected search key corresponding to the ordinal value of the fetched distinction bit to a selected value;
  (4) if the comparison of Step (3) results in equality, then:
    (a) saving the record location reference associated with the fetched distinction bit;
    (b) fetching a next distinction bit from the selected leaf node; and
    (c) continuing at Step (3) until all distinction bits in the leaf node have been compared;
  (5) if the comparison of Step (3) results in inequality, then:
    (a) saving the value of the fetched distinction bit;
    (b) fetching a next distinction bit from the selected leaf node;
    (c) if the fetched distinction bit is greater than the saved distinction bit, then continuing at Step (5) (b);
    (d) if the fetched distinction bit is not greater than the saved distinction bit, then fetching a next distinction bit from the selected leaf node and continuing at Step (3);
wherein the last saved record location reference indicates the location in the computer system of the desired data record.

5. The method of operating the data processing means of claim 4 or of claim 2, wherein the step of selecting the leaf node associated with the selected search key of the desired data record comprises the further steps of:
  (1) reading the first node in the multi-way tree structure from the data storage device and saving said first node in the memory means;
  (2) determining whether the read node is a branch node or a leaf node;
  (3) if the read node is a leaf node, then indicating that the read leaf node is the leaf node associated with the selected search key of the desired data record;
  (4) if the read node is a branch node, then comparing the selected search key to an ordered pair of search keys contained in the read node;
    (a) if the selected search key is greater than or equal to the first of the pair of search keys and less than the second of the pair of search keys, then:
      (i) selecting the branch location or leaf location reference associated with the first of the pair of ordered search keys;
      (ii) reading a next node in the multi-way tree structure from the data storage means using the selected location reference, and saving said next node in the memory means; and
      (iii) continuing at Step (2) for the read next node, until the read next node is a leaf node;
    (b) otherwise, continuing at Step (4) with a next pair of ordered search keys.

6. The method of operating the data processing means of claim 5, further comprising a step for splitting a read next node into two new nodes, the splitting step further comprising the steps of:

(1) after reading a node, determining whether the node is full;
(2) if the node is not full, then continuing with Step (2) of claim 5:
(3) if the node is full, then determining whether the node is a leaf node or a branch node;
  (a) if the node is a leaf node, then:
    (i) locating a distinction bit approximately in the middle of the node;
    (ii) reading from the data storage device the data record corresponding to the record location reference associated with the located distinction bit;
    (iii) saving the search key of the read data record;
  (b) if the node is a branch node, then:
    (i) locating a search key approximately in the middle of the node;
    (ii) saving the located search key;
(4) storing in the data storage device as a first new node all of the information in the read node located on one side of the position of the located middle distinction bit or search key;
(5) saving the location reference of the first new node;
(6) storing in the data storage device as a second new node all of the information in the read node located on the other side of the position of the located distinction bit or search key; and
(7) storing the saved search key and the saved location reference of the first new node.

7. The method of operating the data processing means of claim 6, wherein the step for storing the saved search key and location reference comprises the further steps of:
(1) determining whether the read node has a prior node;
(2) if the read node does not have a prior node, then:
  (a) creating a new prior node in the memory means;
  (b) saving the location reference of the read node in the new prior node;
  (c) saving the saved location reference in the new prior node;
  (d) saving the saved search key between the saved location references; and
  (e) storing the new prior node in the data storage device;
(3) if the read node has a prior node, then:
  (a) reading the prior node from the data storage device and saving the prior node in the memory means;
  (b) comparing the saved search key to an ordered pair of search keys contained in the prior node;
  (c) if the saved search key is greater than or equal to the first of a pair of search keys and less than the second of the pair of search keys, then:
    (i) inserting the saved search key and the saved location reference between (A) the location reference associated with the first of the pair of search keys and (B) the second of the pair of search keys; and
    (ii) storing the read prior node in the data storage device;
  (d) otherwise, continuing at Step (3)(b) with a next pair of ordered search keys.

8. The method of operating the data processing means of claim 4 or of claim 2, further comprising a step for accessing a desired data record having a selected search key, the accessing step further comprising the steps of:
(1) reading the data record in the data storage device at the location indicated by the last saved record location reference;
(2) comparing the selected search key to the search key of the data recrod read;
(3) if the comparison of Step (2) results in inequality, then indicating that the desired data record does not exist in the data storage device;
(4) if the comparison of Step (2) results in equality, then indicating that the data record read is the desired data record.

9. The method of operating the data processing means of claim 8, further comprising a step for indexing a desired data record in the selected leaf node when an indication is made that the desired data record does not exist in the data storage means, the indexing step further comprising the steps of:
(1) storing the desired data record in the data storage device;
(2) determining the distinction bit for the selected search key, comprising the ordinal number of the bit position in the selected search key and the search key of the data record read in which the two keys differ in value;
(3) comparing the selected search key to the search key of the data record read;
(4) if the selected search key is greater than the key of the data record read, then:
  (a) locating in the leaf node, on one side of the distinction bit for the data record read, a distinction bit that is less than the distinction bit for the selected search key; and
  (b) inserting the distinction bit for the selected search key and the record location reference of the stored data record into the leaf node adjacent to the located distinction bit, and between the lcoated distinction bit and the distinction bit for the data record read;
(5) if the selected search key is not greater than the key of the data record read, then:
  (a) locating in the leaf node, on the second side of the distinction bit for the data record read, a distinction bit that is less than the distinction bit for the selected search key; and
  (b) inserting the distinction bit for the selected search key and the record location reference of the stored data record into the leaf node adjacent to the located distinction bit, and between the located distinction bit and the distinction bit for the data record read.

10. The method of operating the data processing means of claim 9, further comprising the step of storing the modified leaf node in the data storage device.

* * * * *